Patented Aug. 21, 1928.

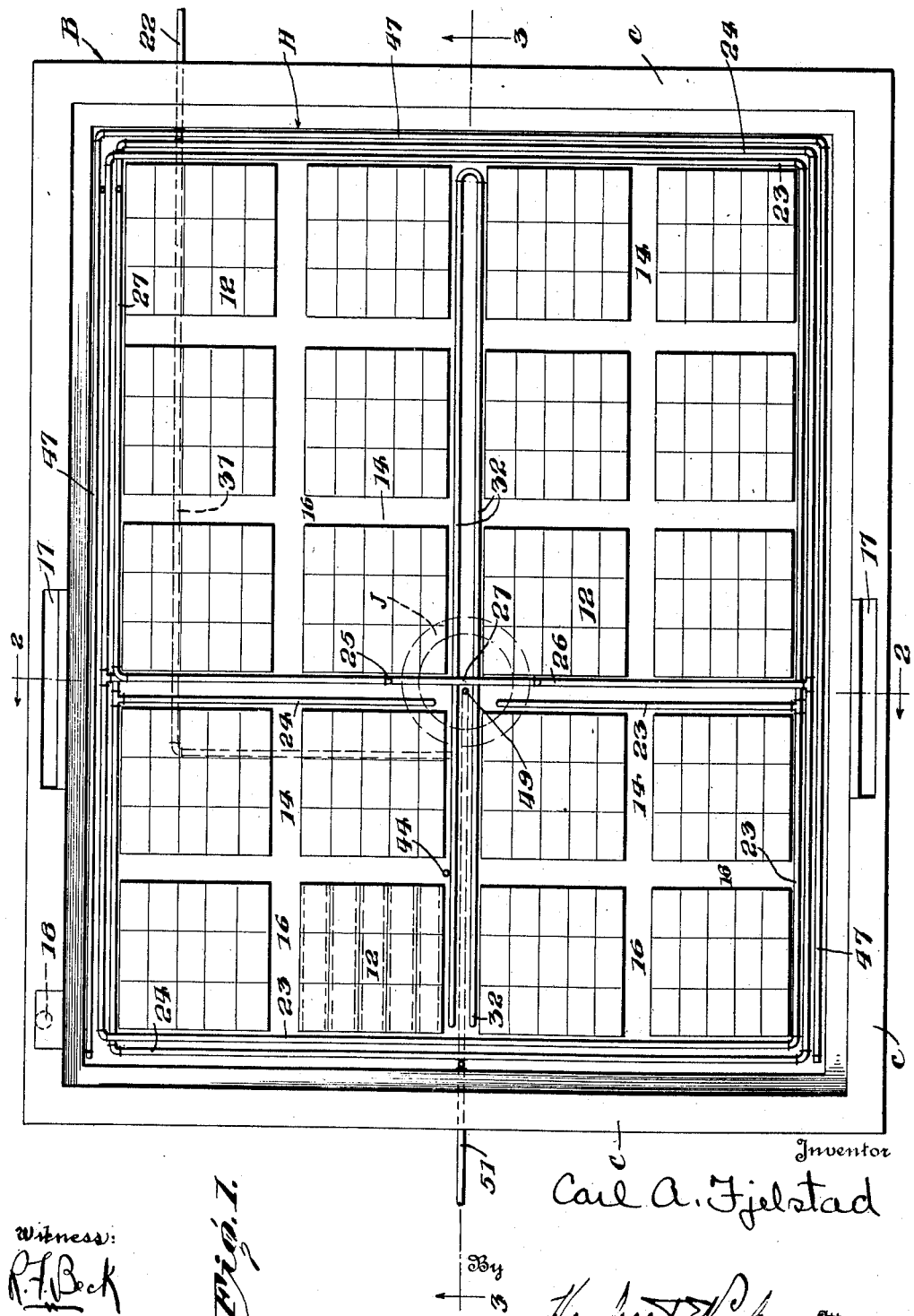

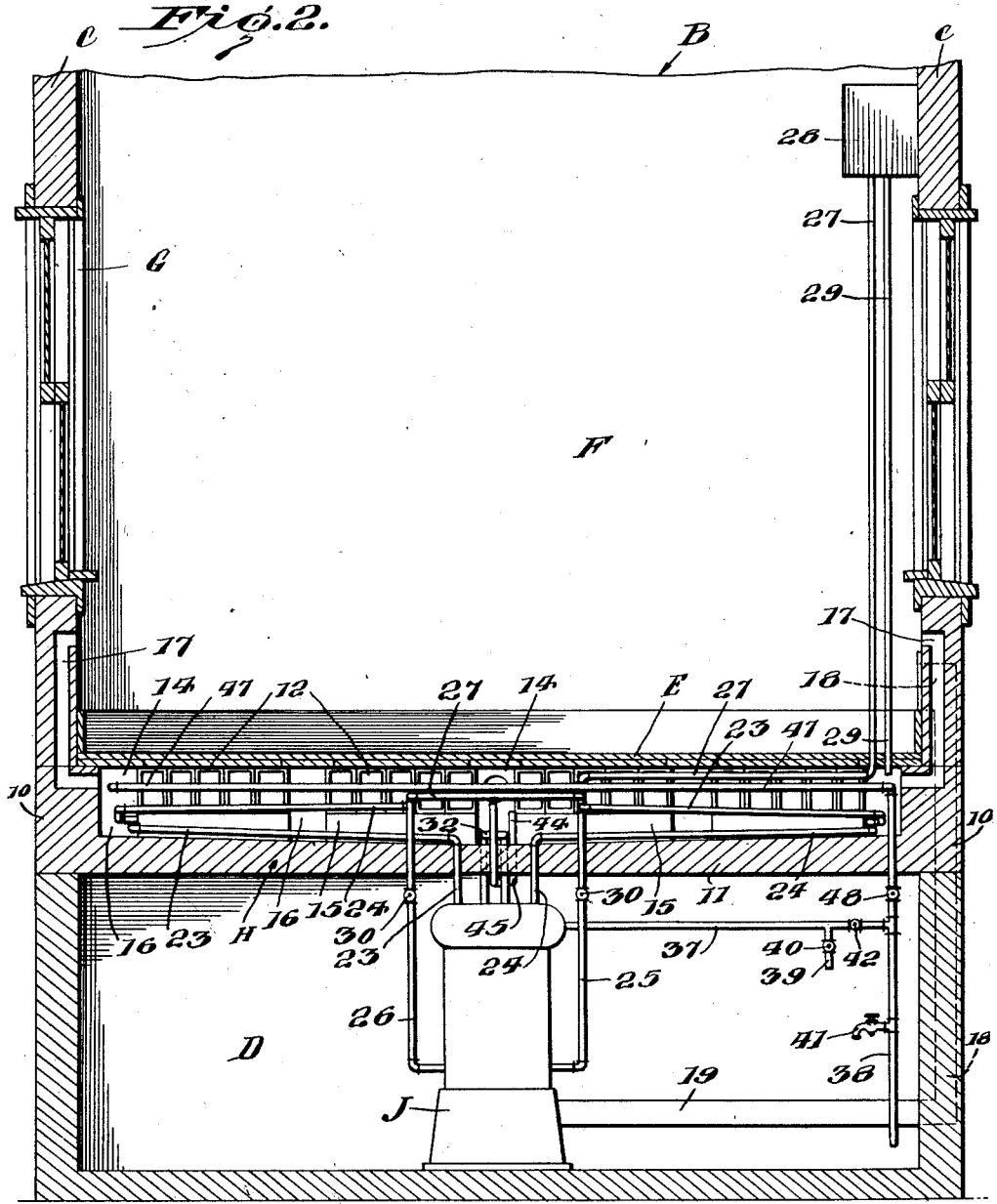

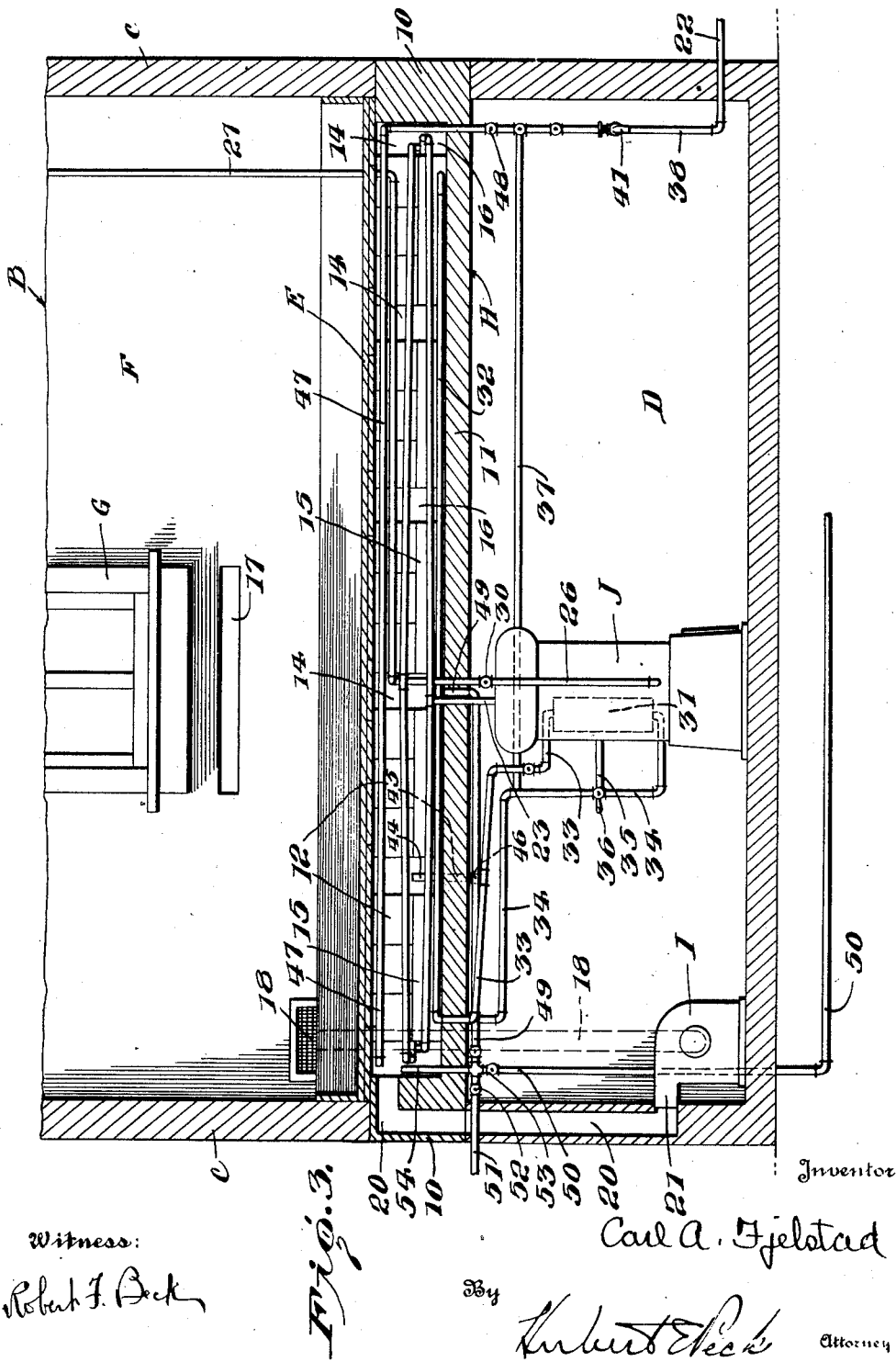

1,681,582

UNITED STATES PATENT OFFICE.

CARL A. FJELSTAD, OF MINNEAPOLIS, MINNESOTA.

HEATING, COOLING, AND HUMIDIFYING SYSTEM FOR BUILDINGS.

Application filed October 5, 1923. Serial No. 666,767.

This invention relates to certain improvements in heating, cooling, and humidifying systems for buildings and the like; and the nature and objects of the invention will be readily recognized and understood by those skilled in the art in the light of the following explanation and detailed description of the accompanying drawings illustrating what I at present consider to be the preferred embodiments or mechanical expressions of the invention from among various other forms, arrangements, combinations and constructions of which the invention is capable within the spirit and scope thereof.

One of the objects of the invention is to eliminate the usual radiators employed in heating systems and make the space occupied by such radiators in a building available for use, and to further provide for the even distribution of heat from a heating system throughout the lower part of the rooms of a bulding at and over the floors thereof by utilizing the floors to radiate the heat from the system.

Another object of the invention is the provision of a heating system so designed and arranged that the same system as installed in a building for heating purposes can be also readily operated as desired to efficiently cool or lower the temperature of the building.

Another object of the invention is to provide a system for heating and for cooling buildings as desired, which system is operable to humidify the air in the building.

Another object of the invention is to provide a system for heating, cooling and humidifying buildings, in which the floors of the building are designed to function and operate as the heat radiating elements of the system, as well as to form cooling and humidifying chambers therefor.

With the foregoing and various other objects and results in view, which other objects and results will be readily apparent to those familiar with this art, from the following description, the invention consists in certain novel features in construction and in arrangements and combinations of elements, as will be more fully and particularly referred to and specified hereinafter.

Referring to the accompanying drawings:

Fig. 1, is a plan view of a floor of a building having a system of the invention installed therein, and showing the piping of the system and subconstruction of the floor.

Fig. 2, is a vertical cross section through the basement and first floor of a building having a system of the invention installed therein, taken as on the line 2—2 of Fig. 1, and showing the piping and furnace of the system in full lines.

Fig. 3, is a vertical cross section similar to Fig. 2, taken as on the line 3—3 of Fig. 1.

In the accompanying drawings I have illustrated one possible form and mechanical adaptation of a system embodying and presenting the principles and features of my invention, purely as an example for purposes of explanation and not by way of limitation, as applied to and installed in a building B of any desired type. A portion only of the building B is shown, including the walls C, basement D with the floor E and room F formed thereabove having the windows G therein, all in the usual manner well understood by those familiar with the building art.

The floor E of the building B is mounted extending over and covering a basin-like subbase H formed of the vertically disposed side walls 10 supported in the building walls C and a bottom wall 11 extending therebetween spaced below the floor E and interiorly sloping or inclined downwardly from the side walls 10 to the central portion thereof, as clearly shown in Figs. 2 and 3 of the accompanying drawings. In the illustrated example the floor E is supported at the edge portions upon the upper edges of the basin side walls 10, and is further supported throughout its area between the basin side walls 10 upon a series of groups or squares of hollow tile or the like 12, as particularly illustrated in Fig. 1 of the drawings. The groups or squares of hollow tile 12 are arranged spaced apart to form passages 14 therebetween with the passages in and through the tile of each group alined and opening into the passages between the groups 12, respectively. The basin bottom wall 11 is provided with a series of bases or supports 15 upon which the squares or groups of hollow tile 12 are mounted, and the bases are of the same shape and form as the tile groups 12 respectively supported thereon, so that a series of ditches or channels 16 are formed around and between the bases 15 and below the passages 14 in vertical alinement and continuation thereof. The passages 14 extend upwardly from and in continuation of the ditches or channels 16 of the basin H, to and are closed at the upper sides thereof by the flooring E. Preferably, although not so limited, the basin H with the bottom wall 11, side walls 10, and bases or supports 15, is formed of and as a monolithic concrete structure. Thus, it is apparent that a series of communicating enclosed chambers are formed by the ditches or channels 16 in the basin H between the bottom wall 11 thereof and the flooring E, and further that the bases 15 and groups of hollow tile 12 are so arranged and disposed as to provide a continuous passage or chamber, formed by ditches 16 and passages 14, extending completely around the basin H adjacent the side walls 10 thereof, as indicated particularly in Fig. 1 of the drawings.

In room F of the building B in the illustrated example, air passages 17 of considerable relative width are formed in opposite side walls C, and open into communication with the room F beneath and adjacent the windows G, respectively. These air passages 17 extend downwardly through the opposite walls C in which formed, to and inwardly through opposite side walls 10 of the basin H beneath the floor E, and open to and are in communication with the outer passage or channel 14 around the basin H at opposite sides thereof, respectively. The arrangement of the air passages 17 is disclosed in detail by Figs. 2 and 3 of the drawings. Another air passage 18 is formed in a wall C of the building B, and extends downwardly therethrough from communication with the room F to the basement D where it is placed in communication with the intake side of any suitable or desired motor operated exhaust fan or blower I, by means of a conduit or the like 19. A passage 20 is formed in or near a wall C of the basement D adjacent to the exhaust fan I and is placed in communication with the discharge side thereof by a conduit 21. The passage 20 extends upwardly through the basement wall to, and discharges into the outer chamber or passage around the basin H beneath the flooring E, formed by the outer ditches 16 and passages 14.

With the foregoing arrangement of air passages 17 and the air passages 18 and 20 in communication with the fan or blower I, by operating the fan I air is withdrawn from the room F through passage 18 and conduit 19 to the fan I, and is then discharged from and forced by the fan into the basin H through passage 20. The air is forced and circulates through and around the enclosed passages formed in basin H beneath flooring E and is then discharged into the room F through the opposite air passages 17, as indicated by the arrows in Figs. 2 and 3 of the drawings.

The invention provides a heating, cooling and humidifying system in connection with the foregoing construction and arrangement of building B and floor E with the basin H. A suitable heating furnace J, which in the example selected and presented herewith is of the hot water heating type well known and understood in this art, is mounted in the basement D of the building B and is supplied with water from the building water supply pipe 22, in the usual or any other desired manner. Two hot water circulating coils 23 and 24 from the furnace J, are mounted in the basin H beneath the flooring E and extend completely therearound in the outer passage or chamber formed around the basin by the outer ditches 16 and passages 14. The circulating coils 23 and 24 return to the furnace J through the return pipes 25 and 26, respectively, so that hot water is circulated from the furnace through coils 23 and 24 around the basin beneath the flooring of room F, and returns to the furnace through pipes 25 and 26. The return pipes 25 and 26 of the circulating coils 23 and 24 respectively, are connected by a pipe 27 above the furnace in the basin H, and this pipe 27 is extended through the basin and upwardly therefrom into the room F where it discharges into an elevated expansion tank 28 mounted on a wall C within the room F. An overflow or discharge pipe 29 extends downwardly from the expansion tank 28 through the floor E and discharges into the outer passage formed around the basin by ditches 16 and passages 14 therein, as clearly shown in Figs. 2 and 3 of the drawings. Shut off valves 30 are mounted in the circulating coil return pipes 25 and 26 at points between the connecting pipe 27 and the furnace J, for a purpose referred to and explained hereinafter.

A hot water coil 31, diagrammatically indicated by dotted lines in Fig. 3 of the drawings, is mounted in the furnace J and connected with a loop of pipe 32 extending across the basin H in a central ditch 16 thereof, by the discharge and return flow pipes 33 and 34 respectively. A pipe 35 controlled by a valve 36 connects the return flow pipe from loop 32 to furnace coil 31 with the furnace water chambers or jacket, so that the coil 31 and loop 32 can be connected and placed in communication with the furnace J, as will be clear by reference to the accompanying drawings. The return flow pipe 34 from the furnace coil 31 is connected with the building water supply pipe 22 by the pipes 37 and 38 for supplying coil 31 and loop 32 in the basin H with water. A branch pipe or connection 39 extends from pipe 37 and is supplied with a shut off valve 40, and a bibcock 41 is mounted in pipe 38 for connection with any suitable water power operated machinery or for other purposes. A shut off valve 42 is also provided in pipe 37 between the pipe 38 and the valve controlled connection 39, for cutting off the supply of water through pipe 37 from the supply pipe 38.

The hot water discharge pipe 33 from the furnace hot water coil 31 to the hot water loop 32 in the central ditch 16 of basin H, is connected with a spray nozzle 44 mounted and disposed in the central ditch occupied by the loope 32, by means of a pipe 45 controlled by any suitable shut off valve 46. In the example illustrated only one of such spray nozzles 44 is shown, but it is to be understood as will be apparent, that a series of such nozzles can be disposed along the central ditch 16 referred to or along the side ditches 16, and that such series can be controlled if desired by a single shut off valve in the pipe connecting the same with the discharge pipe 33 from the furnace hot water coil, such as the shut off valve 46 in the connecting pipe 45.

A sprinkler pipe 47 formed with a multiplicity of apertures, is mounted in the outer passage or chamber formed around the basin H by the passages 14 between the squares or groups of tile 12, and this sprinkler pipe 47 is positioned in and extending around three sides of the basin H, as clearly shown in Fig. 1 of the drawings. The sprinkler pipe is connected to and supplied with water from the pipe 38 which is extended upwardly thereto, and a shut off valve 48 is mounted in and controlling the supply of water through pipe 38 to the sprinkler pipe 47.

The basin H with the ditches 16 formed therein by the bases 15, and sloping or inclined downwardly to the center of the bottom wall 11, are drained by a pipe 49 disposed through the bottom wall 11 centrally thereof or lowest part thereof and extending to and connected with the usual or any other desired arrangement of sewer or waste pipe 50, or connected with and discharging into a sill-cock 51, as desired through proper operation of the valves 52 in drain pipe 49 at opposite sides of the sewer or waste pipe 50, and the valve 53 in the waste pipe 50. An overflow pipe 54 is provided from the outer passage or chamber formed around the basin H and extends downwardly through, to and is connected with the sewer pipe 50 and with the sillcock 51, so as to be capable of discharge through either one thereof as determined by the position of valves 52 and 53, respectively.

In the operation of the system embodying the various features of the invention as above described, in order to heat the room F of building B and humidify the air therein, the hot water heating furnace J is started and the shut off valves 30 in the return pipes 25 and 26 from circulating coils 23 and 24, respectively, are opened. The operation of furnace J causes hot water to pass therefrom through the circulating coils 23 and 24 around the basin H and heat the air within the passages 14 and ditches 16 beneath the flooring E, the heated air passing through the ditches 16 and passages 14, as well as through the squares or groups of hollow tile 12 and evenly distributing heat to the flooring E which radiates to the room F throughout the lower portion thereof. The air within the basin H beneath flooring E is circulated therethrough and discharged into and then circulated through the room F by operation of the fan or blower I in the basement D, which fan draws heated air from the basin beneath the flooring E through the opposite air passages 17. The heated air is circulated through and then drawn from the room F through the passage 18 to the intake side of fan I, and returned from the fan and discharged back into the basin H through the passage 20. In this manner circulation of heated air from the basin H through room F and back to the basin where it is heated by the hot water circulating coils 23 and 24, is obtained.

The air heated in the basin H by coils 23 and 24 and discharged into the room F, is primarily humidified by operation of the spray heads 44. The loop 32 is supplied with and heated by hot water from the heating coil 31 within the furnace J by placing valve 36 to position opening the discharge and return flow pipes 33 and 34, respectively, to communication with the ends of the loop 32, so that hot water passes through loop 32 and returns by pipe 34 to the furnace coil 31, as will be clear by reference to the drawings. The valve 46 in pipe 45 is opened and hot water is supplied thereto from the discharge pipe 33 of furnace heating coil 31, and is discharged by spray heads 44 into the central ditch 16 of basin H over the heated loop 32. The hot water discharged from the spray heads 44 into the central ditch 16 drains through the basin to the central portion thereof, where it passes from the basin through drain pipe 49 to the sewer or waste pipe 50, or to the sillcock 51, as determined by the valves 52 and 53, respectively. Thus, the spray heads 44 discharge hot water over the walls of central ditch 16 and the heated loop 32, and the blower I causes circulation of the heated air over the water draining through the basin ditches, so that the heated air is thoroughly humidified before discharge through passages 17 into the room F.

However, if desired, to assist in humidifying the heated air in basin H before discharge into room F, the sprinkler pipe 47 can be operated to spray water over the walls of outer ditches 16 and the heated circulating coils 23 and 24 therein. The shut off valve 48 in pipe 38 is opened and water is supplied to the sprinkler pipe 47 and is sprayed over the hot water circulating coils 23 and 24 extending around the outer passage formed in and surrounding the basin H. The water discharged from the sprinkler pipe 47 drains from the outer ditch 16 to the central portion of the basin H and through the drain pipe 49, as hereinbefore described.

The operation of the foregoing arrangement and embodiment of the invention as a heating system, obtains an even distribution of heat throughout the room F of the building B by radiation from the flooring E to the lower portion of the room, and by circulation from the basin H beneath the flooring through the air passages 17 and 18. The flooring E with the sub-base or sub-construction formed by the basin H provides a heat radiating and circulating element in which the basin H forms a heating and humidifying chamber having a series of passages extending therein throughout the area thereof. The heated air is thoroughly humidified before discharge into the room F by the action of the sprays 44 and the water discharged therefrom which passes through the basin in the ditches 16 to the central portion thereof from which point it is drained from the basin by the pipe 49, as well as by spraying water in the basin by the sprinkler pipe 47, if desired. The usual radiators employed in heating systems are eliminated by the foregoing system and the space in a building, for example room F of building B, occupied by such radiators is made available for other uses, while at the same time a more even and equal distribution of heat throughout a room is secured, and it is possible to properly and efficiently humidify the air in a room heated by a system of the invention.

When it is desirable to cool or lower the temperature of a building, as during warm weather, it is possible to operate the hereinbefore described heating and humidifying system to function as a cooling system, without structural change or modification and with substantially the same equipment as employed when operated as a heating system for a building. In operation of the invention as a cooling system, the furnace I is not operated as a heating element, and the shut off valves 30 in the return flow pipes 25 and 26 of the circulating coils 23 and 24 respectively, are closed. Water from the supply pipe 38 is turned into the loop of pipe 32 in the central ditch 16 of basin H, by opening valve 42 in the pipe 37. The valve 36 in the return pipe 34 from loop 32 to the furnace coil 31 is turned to position cutting off pipe 34 from coil 31 and opening the same to the pipe 35 which connects with and discharges into the main water space or chamber of the furnace J with which the circulating coils 23 and 24 are connected and in communication. With the valves of the system positioned as described the water from the building supply passes through the loop 32 into the furnace coil 31, through return pipe 34 and pipe 35 into the furnace water space. From the furnace the water then passes and is circulated through the coils 23 and 24 in and around the basin H into the return flow pipes 25 and 26, respectively. However, due to the closing of the shut off valves 30 in the return flow pipes 25 and 26, the water is caused to pass through the pipe 27 connecting the same and upwardly therethrough into the expansion tank 28 where it is discharged, and flows downwardly through the overflow pipe 29 into the outer ditch 16 of the basin H. The water discharged into the outer ditch 16 of the basin H then flows downwardly through the ditches 16 in communication therewith to and is drained from the basin by the drain pipe 49, as explained with reference to the operation of the invention as a heating system.

The valve 48 in the supply pipe 38 is opened to the sprinkler pipe 47 of the basin, and cool or water at relatively low temperature is sprayed into the outer ditch 16 around the basin and flows through the ditches 16 traversing the basin to the drain pipe 49.

It is seen from the foregoing that in operation as a cooling system the water is circulated throughout the entire arrangement of circulating coils mounted in and around the basin H, so that as much heat as possible is absorbed thereby and a material reduction of temperature is obtained in the passages formed by the basin H beneath the flooring, with a resultant lowering of the temperature of the flooring and cooling of a room thereabove. This action is further assisted by the open water discharged from the expansion tank 28 into and running through the ditches 16 of basin H beneath the flooring, and by the water discharged from the sprinkler pipe 47 draining through the basin. By operating the exhaust fan I a further circulation of air from the room F over the circulating coils and open water in ditches 16 in the basin, and discharge of air cooled thereby into the room F is obtained. Further, the water discharged into the basin H from expansion tank 28 and from sprinkler pipe 47, humidifies the cooled air in the basin which is discharged into room F. If desired the spray heads 44 can also be operated to discharge water into and along the central ditch 16 of the basin H, as hereinbefore referred to and explained.

A system of the invention can be operated at relatively small cost for cooling purposes by utilizing the water circulated through the system to perform additional useful work. For example, water power operated machinery such as a washing machine or the like (not shown) can be coupled to the bibcock 41 in the supply pipe 38 and have its discharge coupled to the valve controlled connection 39 in pipe 37 to the discharge pipe 33 from furnace coil 31. Thus, the water supply from pipe 38 passes through the machinery coupled to bibcock 41 and operates the same, and is then discharged through connection 39 to pipe 37 and on through the system in the manner thereinbefore described. In this manner the circulation of the water through the system can be made to perform additional work with a corresponding reduction in cost of operation.

The basin-like sub-base H for and beneath the flooring E, in the illustrated example is shown as formed with the bottom wall thereof sloping downwardly to the central portion thereof, from which portion water discharged in the basin is drained. However, the invention provides for reversing the slope or inclination of this bottom wall to form an inverted bowl or dome shape from which water discharged in the basin drains outwardly to the outer sides of the basin H, and hence it is not desired to limit the invention to the bottom wall of the sub-base having the downward slope to the central portion thereof. Where the span of the sub-structure is relatively great the inverted bowl or dome formation of the bottom wall is preferable, to cause water discharged thereinto to flow and collect at the outer sides at the points of support and thus relieve the basin from a water load at the central portion thereof. It will be apparent that the foregoing is merely the reverse of the illustrated form and lies within the spirit and scope of the invention and is clear from the sub-base construction disclosed in the drawings and described herewith.

Attention is here directed to the fact that the invention is not limited to the use of a hot water type of furnace for heating purposes, as steam or other type furnaces can be likewise utilized and the invention so intends. Further, the invention contemplates and includes, if found desirable or expedient, the supplying of heated air to the passages in the basin under the floor, in any suitable or desired manner well known and understood in this art and not requiring detailed illustration or explanation.

While the illustrated example merely shows a portion of one room and the floor thereof it is to be understood that the principles and features of the invention are intended and adapted for application to and installment in all types of buildings and to any number or arrangement of floors thereof.

It is also evident that various changes, variations, modifications and substitutions might be resorted to without departing from the spirit and scope of my invention, and hence I do not wish to limit myself to the specific disclosures hereof.

Desiring to protect my invention in the broadest manner legally possible, what I claim is:

1. In combination with a building, a heating and cooling system therefor, including a basin-like substructure beneath and covered by the floor to form an enclosed chamber, spaced bases in said substructure upon which the floor is supported, said bases dividing the chamber into a series of communicating passages, means for heating or cooling said passages beneath the floor, and means for spraying water in said passages to humidify the air therein, the passages formed by said bases providing for the drainage of water in said chamber.

2. In combination with a building, a heating and cooling system therefor, including a basin-like substructure beneath a floor to form an enclosed chamber, a series of spaced bases in said substructure upon which the floor is supported, said bases forming a series of communicating passages within the chamber, passages from the chamber to the space in the building above the floor, means for circulating a heating or cooling medium in the chamber, and means for discharging water into said chamber to humidify the air therein, the passages formed by said bases providing for drainage of water through the chamber.

3. In combination with a building, a heating and cooling system therefor, including a chamber formed beneath a floor, circulating coils within said chamber, a hot water heating furnace connected with said coils for supplying heated water thereto, said furnace connected to a source of water supply, a water sprinkler pipe in said chamber for discharging water therein to humidify the air, and means for passing water through said furnace and said circulating coils to lower the temperature in said chamber with the furnace inoperative.

4. In combination with a building, a heating and cooling system therefor, including an enclosed chamber formed beneath a floor, water circulating coils within said chamber, a hot water heating furnace connected with said coils, said furnace connected with a source of water supply, means for circulating water at natural temperatures through said furnace and coils with the furnace inoperative and for discharging water so circulated from the coils into said chamber, and means for draining said chamber.

5. In combination with a building, a heating and cooling system therefor, including an enclosed heating and cooling chamber formed beneath a floor, water circulating coils within said chamber, a hot water heating furnace coupled to said coils, said furnace connected with a source of water supply, a water sprinkler pipe in said chamber connected with the source of supply for spraying water over said coils to humidify the air in the chamber, means for draining water from said chamber, and means for circulating water at natural temperatures through said furnace and coils when the furnace is inoperative and for discharging water from said coils into the chamber to lower the temperature of the air in the chamber.

6. A system for heating and cooling buildings, comprising a hot water heating furnace, water circulating coils adapted to be mounted in a building and connected with said furnace, means for spraying water on said coils to humidify the air surrounding the same, connections from a source of water supply to said circulating coils, and means for causing circulation of water at natural temperatures through said furnace and circulating coils with the furnace inoperative to lower the temperature of the air around said coils.

7. A system for heating and cooling buildings, comprising a hot water heating furnace, water circulating coils adapted to be mounted in a building connected with said furnace, means for spraying water on said coils to humidify the air surrounding the same, connections from a source of water supply to said furnace and coils, means for causing circulation of water at natural temperatures through said furnace and coils with the furnace inoperative to lower the temperature of the air surrounding said coils, and means for forcing circulation of air from around said coils through a building.

8. In combination with a building, including a floor thereof, a substructure beneath and covered by the floor to form an enclosed chamber, spaced supports on said substructure upon which the floor is supported, said bases forming a series of communicating passages, means for discharging water in said chamber to humidify the air therein, and a drain from said chamber, the said passages permitting flow of water through the chamber to the drain, and means for heating or cooling said chamber and passages formed therein.

9. In combination with a building, including a floor thereof, a basin like substructure beneath and covered by the floor to form an enclosed chamber, spaced supports on the substructure for supporting the floor, said supports forming a series of communicating passages through the chamber over the substructure, means for spraying water over the substructure in the chamber to humidify the air therein, a drain from the chamber through the substructure, the passages formed by said supports arranged for flow and drainage of water therethrough over the substructure to the drain, and means for heating or cooling said chamber and passages formed therein.

Signed at Minneapolis, Minnesota, this 14th day of June, 1923.

CARL A. FJELSTAD.